United States Patent [19]
Tzeng

[11] Patent Number: 6,061,712
[45] Date of Patent: May 9, 2000

[54] METHOD FOR IP ROUTING TABLE LOOK-UP

[75] Inventor: Hong-Yi Tzeng, Monmouth, N.J.

[73] Assignee: Lucent Technologies, Inc., Murray Hill, N.J.

[21] Appl. No.: 09/003,767

[22] Filed: Jan. 7, 1998

[51] Int. Cl.[7] .................................................. G06F 15/16
[52] U.S. Cl. .......................... 709/202; 709/202; 709/218; 370/392
[58] Field of Search ................................... 709/218, 202; 370/392, 474, 408; 707/3, 7, 102

[56] References Cited

U.S. PATENT DOCUMENTS

| | | | |
|---|---|---|---|
| 5,519,858 | 5/1996 | Walton | 707/10 |
| 5,546,390 | 8/1996 | Stone | 370/408 |
| 5,566,170 | 10/1996 | Bakke | 370/392 |
| 5,826,262 | 10/1998 | Bui et al. | 707/7 |
| 5,873,078 | 2/1999 | Angle | 707/3 |

OTHER PUBLICATIONS

Robert Endre Tarjan and Andrew Chi–Chih Yao, "Storing a Sparse Table," in Communications of the ACM, vol. 22, No. 11, pp. 606–611 (Nov., 1979).

Gary R. Wright and W. Richard Stevens, "TCP/IP Illustrated, vol. 2—The Implementation," Addision–Wesley Publishing Company, 1995.

*Primary Examiner*—Zarni Maung
*Assistant Examiner*—Khanh Quang Dinh

[57] ABSTRACT

A high speed router employs a hashed radix tree method for IP route look-up operations. The first k bits of an X bit IP address are hashed and used as an index to a RAM whose output is a pointer to the root node of one of a plurality of radix trees. Taking into account the subnet mask of the IP address, each of the radix trees examines the significant bits of the remaining X-k bits of the IP address for a match. Each match is stored in memory at least until a better match is found. If a best match is found a pointer to a second RAM is emitted, whose output is the best route. The tree can be constructed such that one or more bits can be examined simultaneously at each level. To gain the benefit of examining multiple bits at each level and minimize the required memory, a perfect hashing method is employed to eliminate unnecessary nodes in each tree.

9 Claims, 5 Drawing Sheets

FIG. 4

```
Node:= Roots[the first K bits of X]
m:= K
result:= null
while (node is not null){
    if ((node.Number XOR X)AND node.Mask)is zero)
        if("result is null"or"node.Mask>result.Mask")
            result:= node
    if(the m*bit of X is 0)
        node:= node.Left
    else
        node:= node.Right
}
return result-*points to the best matched route*
```

FIG. 5

```
Void    Insert(NUMBER Number,MASK,Mask):
    int         i,n;
    NUMBER      index;
    MASK        m;

m=(0x80000000>>FirstSubTreeBit);
    for(I=0;i<FirstSubTreeBit;i++){
        m=(m<<1);
        if((Mask & m)!=0)
            break;
    }
    n=(1<<i);
    index=((Number & Mask)>>(32-FirstSubTreeBit));
    for(I=0;i<n;i++)
        InsertOne(index+I,Number,Mask);
```

FIG. 6

```
Void    InsertOne(NUMBER Index,NUMBER Number,MASK Mask);
            MASK    m,mT;
            NUMBER  nT;
            int     direction;
            NODE*   node;
            NODE*   parent;

node=Roots[Index];
            parent=(NODE*)0;
            m=(0x80000000>>FirstSubTreeBit);
            while(node!=(NODE*)0){
                    if(Mask==node->Mask&&((node->Number^Number)&Mask)==0){
                            //Inserted Information has the same prefix as node
                            //replace the old information
                            node->Number=Number;
                            return;}
                    if((Mask & m)==0){//hit a don't-care bit in the mask
                            nT=Number;
                            Number=node->Number;
                            node->Number=nT;
                            mT=Mask;
                            Mask=node->Mask;
                            node->Mask=mT;}
                    parent=node;
                    if((direction=(Number & m))==0)
                            node=node->Left;
                    else
                            node=node->Right;
                    m = (m >> 1);}
            node=AllocateNode(Number,Mask);
            if(parent==(NODE*)0)
                    Roots[Index]=node;
            else if (direction == 0);
                    parent->Left=node;
            else
                    parent->Right=node;
```

FIG. 7

```
If(X has no child)
    Set the corresponding pointer (left or right) of X's parent to null
else{
    Y:=any leaf node of a sub tree with X as its root
    Set the corresponding pointer (left or right) of Y's parent to null
    Copy the content of Y into X but keeps X's left and right pointers
}
```

FIG. 9

```
i := 1
m := 0
result := null
node := root internal node
while (node is an internal node){
    n := The first K$_i$ bits of (X>>m)
    Match := node.Match[n/2]
    if(Match is not null)
        if((Match.Number XOR X) AND Match.Mask) is zero)
            if("result is null"or"Match.Mask>result. Mask")
                result := Match
    node := node.Child[n]
    I := i + 1
    m := m + K$_i$
}
return result-*points to the best matched leaf node*
```

6,061,712

METHOD FOR IP ROUTING TABLE LOOK-UP

TECHNICAL FIELD

This invention relates generally to the field of Internet Protocol ("IP") routing. More specifically, the invention relates to an improved efficient method for routing incoming IP data packets to an appropriate output interface and next hop.

BACKGROUND OF THE INVENTION

As used herein, IP data packets refer to data packets containing IP source and/or destination addresses. Typically, IP data packets are routed from source to destination through a series of routers which receive the IP data packet, read the source and/or destination address and re-transmit the IP data packet either to its destination as indicated by the IP destination address contained therein, or to another router which will forward the IP data packet further along until the IP data packet reaches its destination. Each of these intermediate steps between router and destination are referred to as a "next hop." Through the use of a routing look-up table, the router must determine: (i) the output interface port, of which it may have more than one, through which to forward the data packet; and (ii) the "next hop" for that data packet from the node connected to that interface. The combination of output interface and next hop is referred to as the route.

Since there are typically more than one route that will ultimately lead an IP data packet to its destination, prior to routing the data packet, the router must learn the set of addresses to which the IP data packet may be forwarded. Typically the appropriate route for a given IP address is encoded in part or all of the IP address itself. For example, for a 32 bit IP address, the first 16 bits, from left to right, i.e., the route prefix, may be used to indicate the appropriate route to reach that destination. Contained within the route prefix is a subnet mask. The subnet mask indicates with a 1, which of the first eight bits, for example, are significant, and with a 0, which are insignificant.

For example, a route prefix may be represented in hexadecimal format as 12345678 and FFFFF000, where FFFFF000 is the subnet mask. In this case the subnet mask indicates that only bits 12345 are significant. Therefore, the set of addresses appropriate for the route of this IP data packet ranges from 12345000 to 12345FFF.

The next step for the router is to find a route that corresponds to any of the addresses within this set of addresses. It should be apparent that since there are a range of addresses the router may find more than one route that matches an address for this IP data packet. The router's task is to find the best route, defined by the address that has the most bits in common with the IP data packet's destination address. Thus, continuing with the above example, a route matching address 123457 is not as good as a route matching address 123456.

Traditionally, a router look-up operation is performed in linear fashion. Each entry in a look-up table is examined for a match. The operation must continue throughout the table even after a match is found to be certain that the best match was found. Since a router look-up table may have from 30,000 to a few hundred thousand entries, this process is time consuming. As a result, routing table look-up operations are the performance bottlenecks of high-end routers which can have throughput of around 2 Gbps. To eliminate this bottleneck, the router must be able to perform more than four million look-ups per second.

Several proposals have been suggested in the art to reduce or eliminate the performance bottleneck of the router look-up operation. One such proposal is known as Practical Algorithm to Retrieve Information Coded in Alphanumeric ("Patricia"), and employs a radix tree referred to as the PatriciaTree. Referring to FIG. 1, a binary tree is constructed from the information contained in the look-up table (not shown). Each node of the tree examines a different one of the bits of the route prefix and has a link to either two children nodes or no children nodes. For example, root node 15 examines bit number 20 and has children nodes 16 and 17. A node with no children nodes is referred to as a leaf node, node 17, and contains a pointer to a complete route prefix and an associated route stored in RAM 10. For additional information on the Patricia Tree and its construction, see G. R. Wright and W. R. Stevens, "TCP/IP Illustrated, Volume 2," Chap. 18 (1995), hereby incorporated by reference as if fully set forth herein.

Since there are up to two children nodes per parent node, we refer to left and right paths of the router respectively, as the router traverses the tree from parent to one of the children nodes. Thus, if the subject bit of the parent node is a 0, the router will examine the subject bit of node 11, lying on the left path. Similarly, if the subject bit is a 1, the router will examine node 17, lying on the right path. This continues until a leaf node is reached, at which point a comparison is made between the route prefix of the IP data packet and the route associated therewith. A match in a leaf node is considered the best match and therefore the remaining routes do not need to be searched. If, however, there is no match at the leaf node the router must backtrack along the tree. In FIG. 1 this is shown by the arrow path traversing nodes 16–18–16–19.

While this method supports subnet masks, large numbers of route entries, and eliminates the necessity in many cases to search each route entry, it can require, in a worst case scenario, $h^2$ iterations where h is the height of the tree and can be as large as the entire IP address.

A second proposal that addresses the router performance bottleneck is known as Content Addressable Memory ("CAM"). Referring to FIG. 2, CAM 25 is employed to cache the results of routing table look-up operations. Given an IP address 20 a CAM can parallel search its entries for a match. If there is a match a pointer is emitted to find the output interface and other information from RAM 28. While a CAM is efficient in search speed, it is expensive and small in capacity as compared to regular RAM. Moreover, since a CAM can only perform searches on whole IP addresses, it does not naturally support subnet masks.

Because of these drawbacks and because CAM can only support a relatively small number of entries, other proposals employ a combination of CAM and other methods. Yet, the use of CAM remains expensive and inefficient due to its lack of support for subnet masks.

SUMMARY OF THE INVENTION

The present invention enables relatively high speed route look-up operations which reduces, and in some cases eliminates, the router as a performance bottleneck. The hashed radix tree method of the present invention hashes the first k bits of an X bit IP address to several radix trees, each of which is smaller than a single radix tree examining an entire IP address, for example the Patricia tree. The first k bits of the IP address of the IP data packet are used as an index to a RAM whose output is a pointer to the root node of one of these smaller radix trees. Taking into account the subnet mask of the IP address, each of the radix trees examines the significant bits of the remaining n-k bits of the IP address for a match. Each match is stored in memory at least until a better match is found. a match at a leaf node is considered a best match. If a match is found a pointer to a second RAM is obtained, whose output is the best route.

In one advantageous embodiment of the present invention the root node of each radix tree examines the $(k+1)^{th}$ bit of the IP address. At each subsequent level a single bit is examined. In a second advantageous embodiment of the present invention the root node examines a range of bits $B_0$ to $B_1$, starting with the $(k+1)^{th}$ bit. If a match is found it is stored and a pointer selects one of the $2^{(B_1-B_0+1)}$ children as the next node in which to examine the $B_1$ to $B_2$ bits of the IP address.

In a further embodiment of the present invention, efficiency of a router designed in accordance with the present invention is enhanced through a hashing procedure that eliminates unused memory slots associated with certain nodes of the hashed radix tree.

BRIEF DESCRIPTION OF THE DRAWINGS

FIG. 4 represents one advantageous set of pseudo code for searching the best matched route of an IP address in accordance with the first embodiment of the present invention.

FIG. 5 represents one advantageous set of pseudo code for inserting a node into the Hashed Radix Tree of the present invention.

FIG. 6 represents the definition of the Insert one function used in the software instructions of FIG. 5.

FIG. 7 represents one advantageous set of pseudo code for deleting a node from the Hashed Radix Tree of the present invention.

FIG. 9 represents one advantageous set of pseudo code for searching the best matched route of an IP address in accordance with the second embodiment of the present invention.

DETAILED DESCRIPTION OF THE INVENTION

Figure 1:
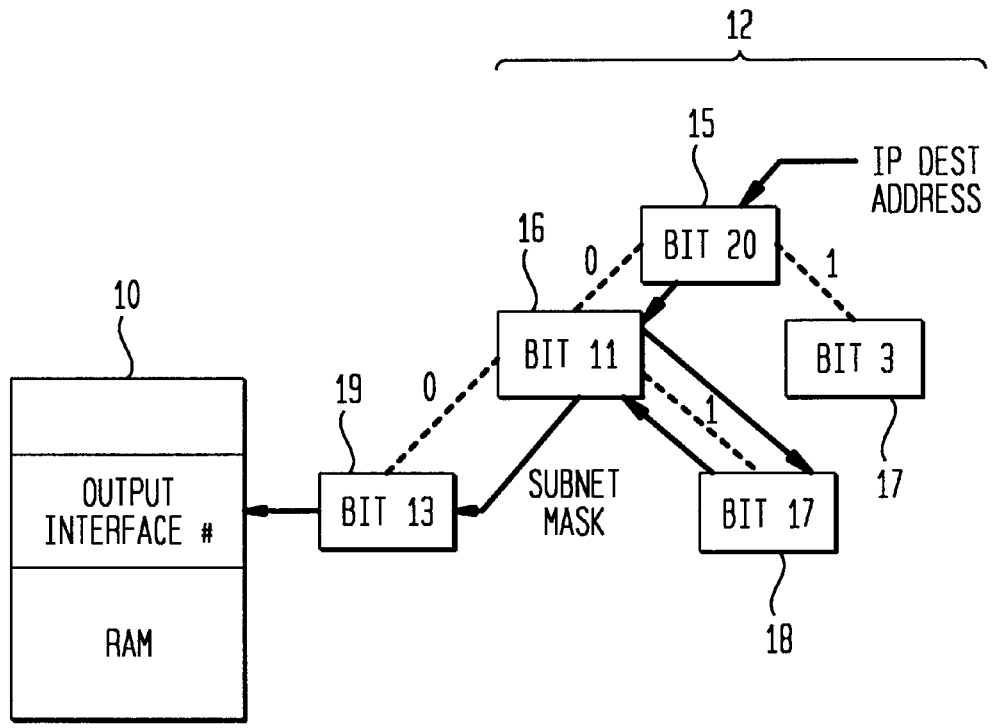
FIG. 1 is a prior art illustration of the PatriciaTree method for IP route look-up.
Figure 2:
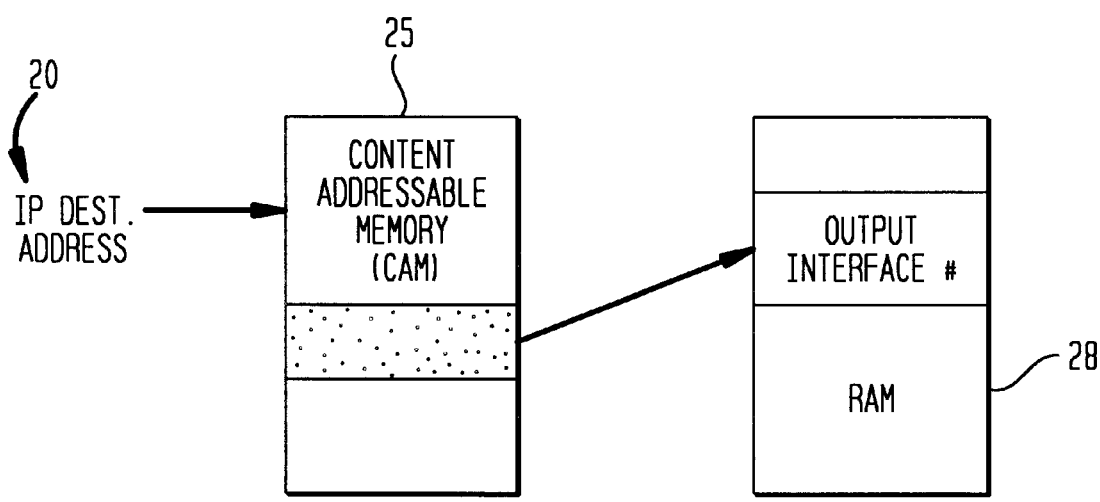
FIG. 2 is a prior art illustration of the CAM method for IP route look-up.
Figure 3:
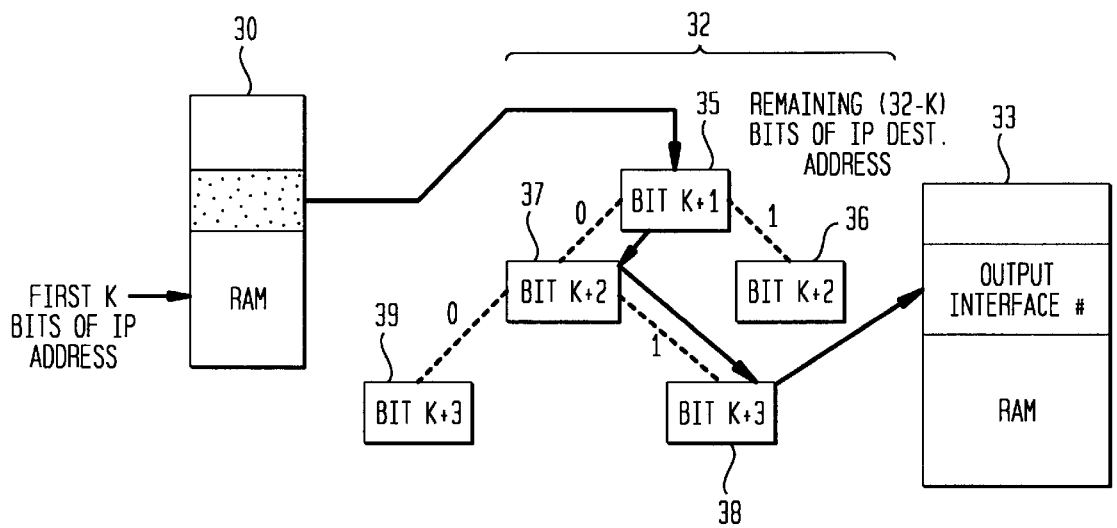
FIG. 3 illustrates a first embodiment of the Hashed Radix Tree method of the present invention.

In contrast to the Patricia Tree of the prior art, the Hashed Tree Matrix as taught herein comprises a plurality of smaller radix trees, one for each possible combination of the first k bits of the IP address which relate to a possible route. Referring to FIG. 3, a general schematic of a Hashed Radix Tree method of route look-up in accordance with the present invention is shown. Using for example a 32 bit IP address, the first k bits of the IP address are treated as an index to RAM 30. The size of k will ordinarily depend on engineering constraints such as search time and memory requirements. Larger K will result in shorter search times but increase the memory demand. In one advantageous embodiment of the present invention k is set equal to 16.

The output of RAM 30 is a pointer to the root node of one of the plurality of trees, in the case of FIG. 3, root node 35 of tree 32. Each node in tree 32 has the same k-bit prefix as the first k bits of the IP address. Starting with root node 35, the $(k+1)^{th}$ bit of the IP address is examined. If it is a 0, the look-up proceeds to the left of the root node, child node 37. If it is a 1, the look-up proceeds to the right, child node 36. Assuming the k+1 bit is a 0, the k+2 bit is examined at child node 37. This continues through the 32nd bit—a perfect match, unless a leaf node is first reached—indicating either no match is available or that the last match found is the best match.

During the look-up process, several matches may be found. This occurs because at each level i (from 0 to 31), the examining node will have a subnet mask property equal to at least (i+1) and a number property identifying an IP address which can be reached by the router. If the subject mask as applied to the number equates with the K (i+i) H bits of the subject IP address, a match is obtained. It will be apparent to one skilled in the art that as the look-up progresses from parent node to child node, more significant subnet masks will be applied and a later found match will be a better match. Accordingly, the last match found, i.e. the best match at that point, is stored along with a pointer to RAM 33 in which the corresponding output interface and next hop is located. This proceeds until a leaf node, i.e., the 32nd bit node is reached. The leaf node indicates that no better route exists and the last obtained match is the best match. A match at the 32nd node indicates a perfect match. In either case the last stored pointer to RAM 33 determines the output interface and next hop corresponding to this IP address. If there is no match throughout the look-up process, then there is no route entry for this IP address.

The Hashed Radix Tree is constructed by defining a node with left (Left) and right (Right) pointers, an IP address (Number) and a subnet mask (Mask) to determine which bits of the Number are significant. In addition, two properties are maintained after each insertion and deletion of routes. One, every descendant of a node labeled with bit B shares the same B-bit prefix. Two, every non-root node examining bit B of the IP address has a subnet mask at least B bits long.

Referring to FIG. 4, one advantageous set of instructions is shown to find the best matched nodal information inside the Hashed Radix Tree for a given IP address X. Initially, the root node "Node" of the subtree whose first K bits are identical to the first K bits of X, is identified. The root node "Node" is the $y^{th}$ element of the root table "Root[ ]", where y denotes the number corresponding to the first K bits of X. If Node is empty, then there is no match. As long as Node is not empty the search continues on the Node subtree. At each node along the subtree the stored address is compared for a match with X. If there is a match, the matched node with the longest prefix is stored. The search proceeds to the children node of "Node," by examining the $(K+1)^{th}$ bit of X. If the $(K+1)^{th}$ bit of X is 0, the left child node is examined. Otherwise, the right child node is examined. Node is then replaced with the corresponding child node. These steps are repeated as the subtree is traversed until Node is empty.

From time to time a router has to update its look-up table. This can be accomplished through any known means such as routing protocols, Rating Information Protocol ("RIP") and Open Shortest Path First ("OSPF"). When the updating process seeks to insert a new route, this route must be inserted into the Hashed Radix Tree. The Insert and Insert one functions shown in FIGS. 5 and 6, respectively, illustrate one advantageous set of instructions for inserting a new route while maintaining the common prefix property described above.

Similarly, the updating process may require the removal of a route no longer available to the router. An IP route entry can be deleted from the Hashed Radix Tree using the illustrative set of instructions shown in FIG. 7 which also maintains the common prefix property of the Hashed Radix Tree. This process has a time complexity close to the search time of an IP address.

It should be noted that the IP address referred to throughout this description of the invention is commonly a destination address, but can point to point transmission the router determines the route of an IP data packet from the encoded destinations address. However, in certain applications the proper route also requires matching a route to the source address. This requirement arises for example in multicast transmissions. Frequently, in multicast, every router will attempt to send the IP packet along sufficient routes to reach every destination. The router, however, must also keep track of where the IP packet came from to avoid a duplication of efforts.

For example, consider an IP packet that must be distributed to destinations A, B, C, and D. The IP packet may first be forwarded to router X. Router X may forward the packet along routes 1 and 2 in order to reach a and B and to router Y which lies along route 3, to reach C and D. Router Y knows that the multicast destinations are a, B, C, and D. To avoid returning the IP packet to router X, router Y must also be made aware that routes for a and B are available through router X and that it received the IP packet from router X. Accordingly, a look-up process for the IP source address is necessary and the present invention can be advantageously applied.

The present invention includes the advantages, while removing many of the disadvantages, of the prior art. Namely, the present invention performs fast look-up—no more than 32-k iterations per look-up; does not require CAM; supports subnet mask look-up and best matching; and supports large numbers of route entries. By grouping every possible route for a given combination of a k bit prefix of an IP address in a single tree, those routes that cannot match the given IP address and subnet mask are eliminated from the look-up process.

Figure 8:
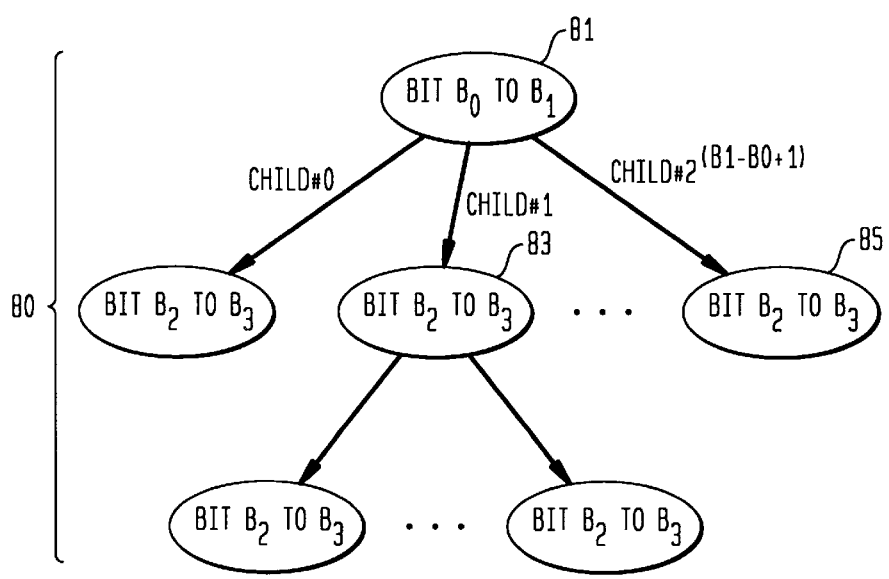
FIG. 8 illustrates a second embodiment of the Hashed Radix Tree method of the present invention.

As described above with respect to a first embodiment of the present invention, the first search step uses the first k bits of the address to determine the root of a binary tree and in each subsequent search step, the next significant bit of the address is examined to determine the next branch of the search. In a second advantageous embodiment of the subject invention, the number of bits to be examined at each level is dynamically adjusted, leading to a further reduction in searching time. Referring to FIG. 8, after being pointed to tree 81, the search process starts with root node 81 which is labeled for examination "Bit $B_0$ to $B_1$." In the first step, the $B_0^{th}$ to $B_1^{th}$ bits of the searched address are first examined to determine whether there is any match at this node. If there is any match, the matched result is saved. Then, the to $B_0^{th}$ to $B_1^{th}$ bits of the searched address is employed to select one of the $2^{(B_1-B_0+1)}$ children as the next node, for example 83 or 85. In the next step, a similar search process is performed on the $B_1^{th}$ to $B_2^{th}$ bits of the searched address.

To ensure that only one directed path is examined for each address search, the two properties of the Hashed Radix Tree to be maintained after insertion and deletion of a node are generalized as follows: One, every descendant of a node labeled with bits $B_i$ to $B_{i+1}$ shares the same $B_i$ to $B_{i+1}$-bit prefix. Two, every non root node examining bits $B_i$ to $B_{i+1}$ of the IP address has a subnet mask at least $B_{i+1}-1$ bits long. Note, however, that if n bits are examined at a node, there may be up to $2^{n-1}$ masks and corresponding pointers per node.

Because each internal node, i.e. a node with children, can have as many as $2^m$ (as used herein, $C=2^m$) pointers to children nodes we separately define internal node (class INT-NODE) and leaf node (class LEAF-NODE). An internal node with k children is defined with a set of pointers to each of its internal node children, if any, and a set of pointers to its leaf node children, if any. If there is a match at the internal node, the corresponding Match bit is set; the FirstMatch of the internal node points to an array of leaf nodes. Each leaf node contains the IP address and the subnet mask of a route.

Referring to FIG. 9, one advantageous set of instructions is shown to find the best matched nodal information for a given IP address X while maintaining the two generalized properties described above, of the Hashed Radix Tree. Node and Match denote two variables. "Node" is initially set to the root node of the appropriate subtree as described in connection with FIG. 4. n equals the number corresponding to the first $K_1$, bits of the address X and "Match" equals the $(n/2)^{th}$ entry of the array of Node.Match[ ]. If Match is not empty, the stored address is compared with X for a match. If there is a match, the matched node with the longest prefix is stored. If Match is empty, there is no match. Thereafter, Node is replaced by the $n^{th}$ child of Node, and the search is continued. The second iteration examines the $K_1+1$ to $K_2$ bits of X with n equal to the number corresponding to the $K_1+1$ to $K_2$ bits of X. The above steps are repeated until Node is not an internal node.

It will be apparent to one skilled in the art that the address X can be searched in at most n iterations where $$\sum_{i=1}^{n}$$

$K_i$ is no less than the number of bits in X and $K_i$ is the number of bits of X that are examined at the $i^{th}$ step.

While the second embodiment has the advantage over the first look-up of faster look-up, it is at the expense of increased memory demands for each node. Indeed, the memory requirement for the internal nodes increases exponentially with the number of bits to be examined in each step.

In a third embodiment of the present invention the increased memory demand can be reduced by eliminating pointers to those of the $2^m$ children of an internal node that have no corresponding route. The elimination of these unnecessary nodes can be accomplished through a perfect hashing algorithm known in the art, such as described in R. E. Tarjan and A. C. Yao, "Storing a Sparse Table," Communication of the ACM 22(11):608–11(1979), hereby incorporated by reference as if fully set forth herein. Note, however, that the use of this additional hashing process will increase the time to insert/delete routes to the table.

The foregoing merely illustrates the principles of the present invention. Those skilled in the art will be able to devise various modifications, which although not explicitly described or shown herein, embody the principles of the invention and are thus within its spirit.

What is claimed is:

1. A method for determining a best route for an IP data packet comprising at least one IP address of X bits, said method comprising the steps of:

determining said IP address of said IP data packet;

indexing a first memory source using k bits of said IP address, for a pointer to a hashed radix tree comprising at most X-k levels of nodes;

traversing said hashed radix tree by examining at least one of said X-k bits of said IP address at each of said at most X-k levels, for a pointer to one of a plurality of child nodes, said child nodes being either an internal node or a leaf node; and emitting a pointer from each one of said nodes to a second memory source storing said best route corresponding to said IP address.

2. A method according to claim 1 wherein X equals 32 and k equals 16 and wherein said 16 bits are the first 16 most significant bits of said IP address.

3. A method according to claim 1 wherein associated with said internal nodes is a subnet mask and a pointer to a route stored in said second memory source, corresponding to said IP address when constrained by said subnet mask, and wherein said traversing step further comprises the steps of:

examining at each level for the presence of a match of said IP address constrained by said subnet mask to a route;

for each newly found match, if said newly found match is better than a prior found match stored in a memory means replacing said prior found match in said memory means with said newly found match; and using said pointer of the last found match to retrieve from said second memory source, said best route for said IP address.

4. A method according to claim 1 wherein the IP address is an IP destination address.

5. A method according to claim 1 wherein the IP address is an IP source address.

6. A method according to claim 1 further comprising the step of applying a perfect hash process to said hashing radix tree to eliminate said nodes of said hashing radix tree which have no corresponding associated therewith.

7. A router for determining a best route for an IP data packet comprising at least one IP address of X bits, comprising:

means for determining said IP address of said IP data packet;

a first memory source for storing a plurality of pointers indexed according to k bits of said IP address;

a plurality of hashed radix trees comprising X-k levels of nodes, each of said plurality of pointers leading to a different one of said plurality of hashed radix trees, each of said nodes corresponding to one or more of said X-k bits of said IP address and including a subnet mask and one or more pointers;

means for examining at each node one or more of said X-k bits of said IP address corresponding to said node to determine the value of said one or more of said X-k bits and to determine whether said IP address satisfies said subnet mask of said node;

at each of said nodes, one or more first pointers to one or more child nodes, if any, dependent on said value of said X-k bits examined at said node;

a second pointer at each node whose subnet mask and said IP address corresponds to a route; and a second memory for storing each of said routes available at said router, said second pointer of each of said nodes directed to one of said routes stored in said second memory.

8. A method for determining a best route for a data packet having an address of (n+k) bits, said method comprising the steps of:

creating a plurality of radix trees for route searching, each radix tree of said plurality having one or more nodes including a root node and being of a depth no greater than n, all nodes of said each tree having a tree specific k-bit field associated with said each tree;

building a list of pointers to the root nodes of said plurality of radix trees, each pointer pointing to a root node associated with said each pointer, said each pointer indexed in said list in accordance with the tree specific k-bit field of said root node associated with said each pointer;

using a predetermined set of k bits of said address of said packet as an index to a first pointer in said list, said first pointer associated with a first radix tree; and searching said first radix tree for said best route.

9. A method according to claim 8, wherein said step of creating a plurality of radix trees for route searching includes a step for creating a plurality of radix trees for route searching;

said step of searching said first radix tree includes a step for searching said first radix tree for said best route;

said k-bit field is a k-bit prefix; and said predetermined set of k bits includes k most significant bits of said address.

* * * * *